(12) United States Patent
Emery et al.

(10) Patent No.: US 6,519,242 B1
(45) Date of Patent: Feb. 11, 2003

(54) APPARATUS AND METHOD OF PSTN BASED NETWORK ROAMING AND SCP BASED SUBSCRIBER MANAGEMENT FOR INTERNET TELEPHONY SYSTEMS

(75) Inventors: Jason Gerrit Emery, Apex, NC (US); William David Gentry, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/207,938

(22) Filed: Dec. 9, 1998

(51) Int. Cl.$^7$ .......................... H04Q 7/24; H04L 12/66

(52) U.S. Cl. .................. 370/338; 370/352; 370/401; 379/219; 455/433

(58) Field of Search ......................... 370/352–356, 370/351, 400, 401, 310, 338; 455/432, 433, 435, 445; 379/219, 220.01

(56) References Cited

U.S. PATENT DOCUMENTS

| | | | | |
|---|---|---|---|---|
| 5,600,705 A | * | 2/1997 | Maenpaa | 379/58 |
| 6,014,377 A | * | 1/2000 | Gillespie | 370/351 |
| 6,061,346 A | * | 5/2000 | Nordman | 370/352 |
| 6,075,783 A | * | 6/2000 | Voit | 370/352 |
| 6,205,523 B1 | | 3/2001 | Voit | 370/389 |
| 6,222,829 B1 | * | 4/2001 | Karlsson et al. | 370/329 |
| 6,226,523 B1 | | 5/2001 | Karlsson et al. | 455/466 |
| 6,259,782 B1 | * | 7/2001 | Gallant | 379/211 |
| 6,304,753 B1 | * | 10/2001 | Hartmaier | 455/413 |

FOREIGN PATENT DOCUMENTS

| | | |
|---|---|---|
| GB | 2321158 | 7/1998 |
| WO | WO 96/38018 | 11/1996 |

OTHER PUBLICATIONS

Hansson A. et al: "Phone Doubler—A Step Towards Integrated Internet and Telephone Communities" Ericsson Review, SE, Ericsson, Stockholm, No. 4, p. 142–151.

MacKenzie F: "The Challenge of Universal Personal Communications" British Telecommunications,Engineering, GB, British Telecommunications Engineering, London, vol. 16, No. 3, p. 232–236.

Schoen U et al: "Convergence Between Public Switching and the Internet" ISS. World Telecommunications Congress. (International Switching Symposium), CA, Toronto, Pinnacle Group, p. 549–560.

\* cited by examiner

Primary Examiner—Huy D. Vu
Assistant Examiner—Duc Ho
(74) Attorney, Agent, or Firm—Withrow & Terranova, P.L.L.C.

(57) ABSTRACT

A system and method of PSTN based network roaming and SCP based subscriber management for internet telephony systems. When a call is incoming to the central office 60 of a subscriber's home service area which supports packet data network telephony 10, such as for instance IP telephony, a home location register 40 translates the directory number into an IP address, URL address, or electronic mail address much the same that a local number portability node re-routes calls for non-IP telephony systems. When a subscriber is roaming in another network 100, the roamed into (visited) gateway 130 signals back to the home location register 40 of the subscriber's network 20 and registers its (i.e., the visited gateway's) public switching telephone network 70 telephone directory number and the IP address assigned to the subscriber while connected to the visited network 100. When subsequent calls are incoming to the subscriber's home network switch, the home location register 40 provides the ten (10) digit directory number of the visited gateway 130 and the new IP address rather than the home gateway telephone number and IP address of the subscriber.

39 Claims, 9 Drawing Sheets

APPARATUS AND METHOD OF PSTN BASED NETWORK ROAMING AND SCP BASED SUBSCRIBER MANAGEMENT FOR INTERNET TELEPHONY SYSTEMS

TECHNICAL FIELD

The present invention relates to using a signaling control point to act as a home location register for a wireless or wireline telephone switch that supports internet protocol (IP) telephony.

BACKGROUND AND RELATED ART

Currently, wireless subscriber profile data is configured in a home location register (HLR). The HLR resides either on a computing module (CM) which is an end office telephony switch or in an off-board node that supports IS-41 protocol signaling. The subscriber data profile is retrieved from the HLR upon registration and stored in a visitor location register (VLR) while the subscriber is actively roaming. By contrast, wireline subscriber profile data, which includes internet (IP) telephones, is stored within the computing module in the form of table data. Wireline subscribers currently do not have public switching telephone network (PSTN) roaming capability.

The present invention addresses several shortcomings of the current configuration. First, the current subscriber profile data in the computing module does not provide the ability to map E.164 telephone directory numbers into internet addresses, e-mail addresses or universal resource locators (URLs) as may be used by IP telephones. Second, current systems have no provision for wireline mobility because an assumption is made that the address of a wireline is fixed, tied to a physical interface, and only moved by changes to the provisioned tables.

SUMMARY OF THE INVENTION

As with standard wireline telephony subscribers, IP telephony subscribers are assigned a standard ten (10) digit E.164 directory number (hereinafter "directory number") comprised of a three (3) digit area code, a three (3) digit exchange within the area code, and a four (4) digit unique extension within the exchange. When a call is incoming to the central office of a subscriber's home service area which supports computer network telephony, such as for instance IP telephony, a signaling control point translates the directory number into an IP address, URL address, or electronic mail address much the same that a local number portability node re-routes calls for non-IP telephony systems. The signaling control point is signaled from an advanced intelligent network (AIN) termination attempt trigger point and provides the directory number of an H.323 gateway and the IP address of the subscriber's H.323 IP telephony end point. If the subscriber has de-registered from the signaling control point, an overflow route to a land line or voice mail is provided.

Local number routing (LNR) fields are re-used with the local number becoming the ten (10) digit directory number of the gateway, and the called directory number (CDN) becoming the IP address, or a new transmission control application protocol (TCAP) field could be introduced specifically for the IP address.

When a subscriber is roaming in another network, the roamed into (visited) gateway signals back to the home location register/signaling control point of the subscriber's network and registers its (i.e., the visited gateway's) public switching telephone network telephone directory number and the IP address assigned to the subscriber while connected to the visited network. When subsequent calls are incoming to the subscriber's home network switch, the home location register/signaling control point provides the ten (10) digit directory number of the visited gateway and the new IP address rather than the home gateway telephone number and IP address of the subscriber.

This provides the subscriber with a virtual private network for placing telephone calls over IP terminals. Thus, subscribers have the ability to roam among networks and continue placing or receiving telephone calls ubiquitously. The subscriber maintains a single telephone directory number and receives service no matter which IP network he is currently connected to. Under the present invention, subscribers can, for instance, move from a static network connection at work to a dial in network connection from home.

The present invention provides a method of managing call origination for subscribers on a packet data telephony network which includes a home location register. A subscriber registers a packet data communication (IP telephony) device with the home location register of the subscriber's home packet data (IP) network, and uses the home location register to translate the subscriber's packet data (IP) address into a E.164) telephone directory number.

The present invention also provides a method of managing call termination (i.e., call reception) for subscribers on a packet data telephony network which includes a home location register. The subscriber registers a packet data communication (IP telephony) device with the home location register of the subscriber's home packet data (IP) network, and uses the home location register to translate the subscriber's E.164) telephone directory number into a packet data (IP) address.

The present invention further provides a method of public switching telephone network based roaming call origination for IP telephony devices. The subscriber registers his IP telephony device on a remote IP network, and may originate calls from the IP telephony device on the remote network to a third party.

The present invention still further provides a method of public switching telephone network based roaming call termination (i.e., call reception) for IP telephony devices. An IP subscriber registers his IP telephony device on a remote IP network, and may receive calls on the IP telephony device on the remote network from a third party.

It is therefore an object of the invention to provide PSTN based network roaming for IP telephony devices.

It is a further object of the invention to provide SCP based management for IP telephony devices.

Some of the objects of the invention having been stated hereinabove, other objects will become evident as the description proceeds, when taken in connection with the accompanying drawings as best described hereinbelow.

DETAILED DESCRIPTION

Figure 1:
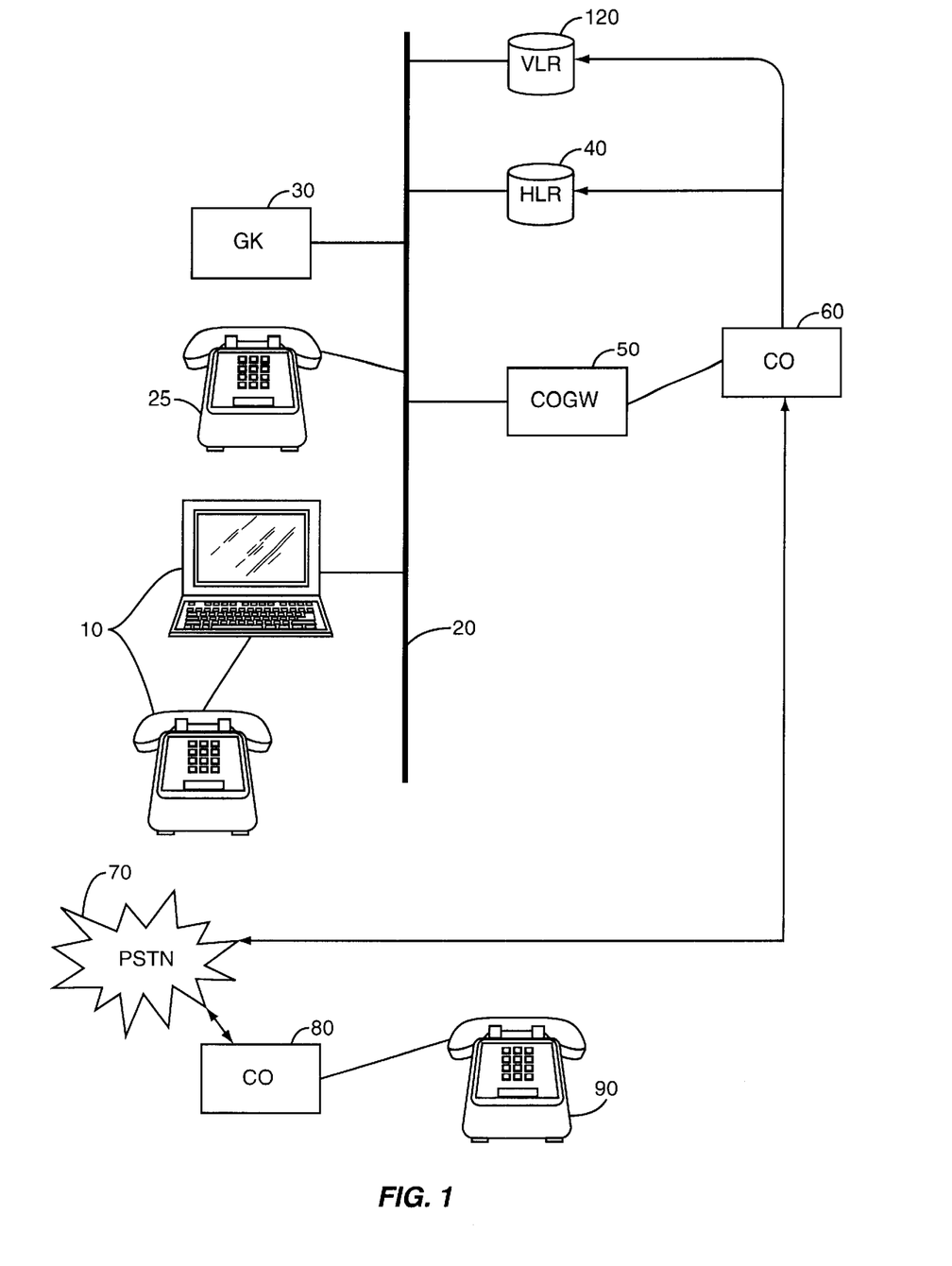
FIG. 1 is a block diagram illustrating the hardware nodes present in a subscriber's home area network and a link to outside networks.
Figure 2:
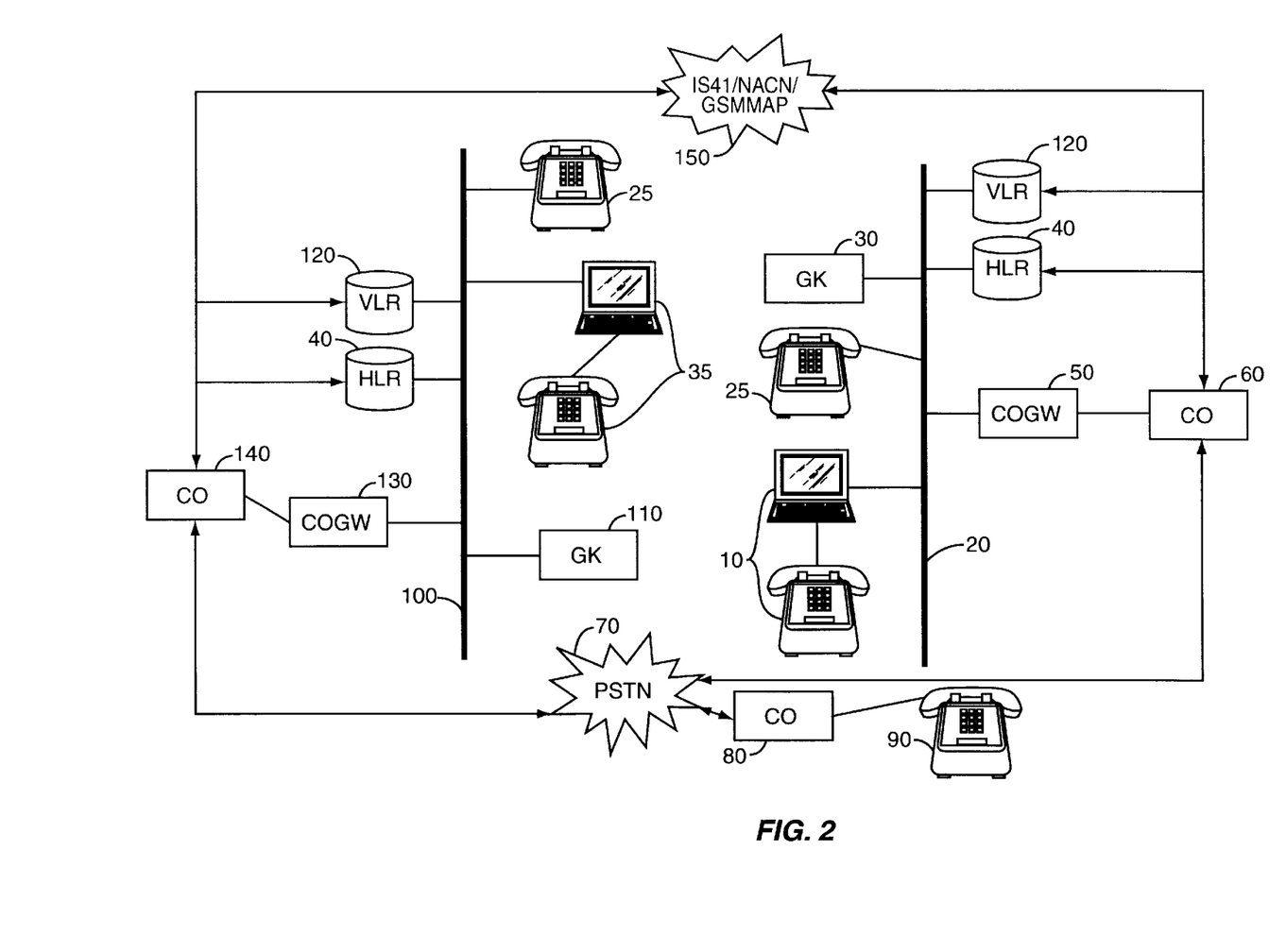
FIG. 2 is a block diagram illustrating the hardware nodes required for roaming on a public network.
Figure 3:
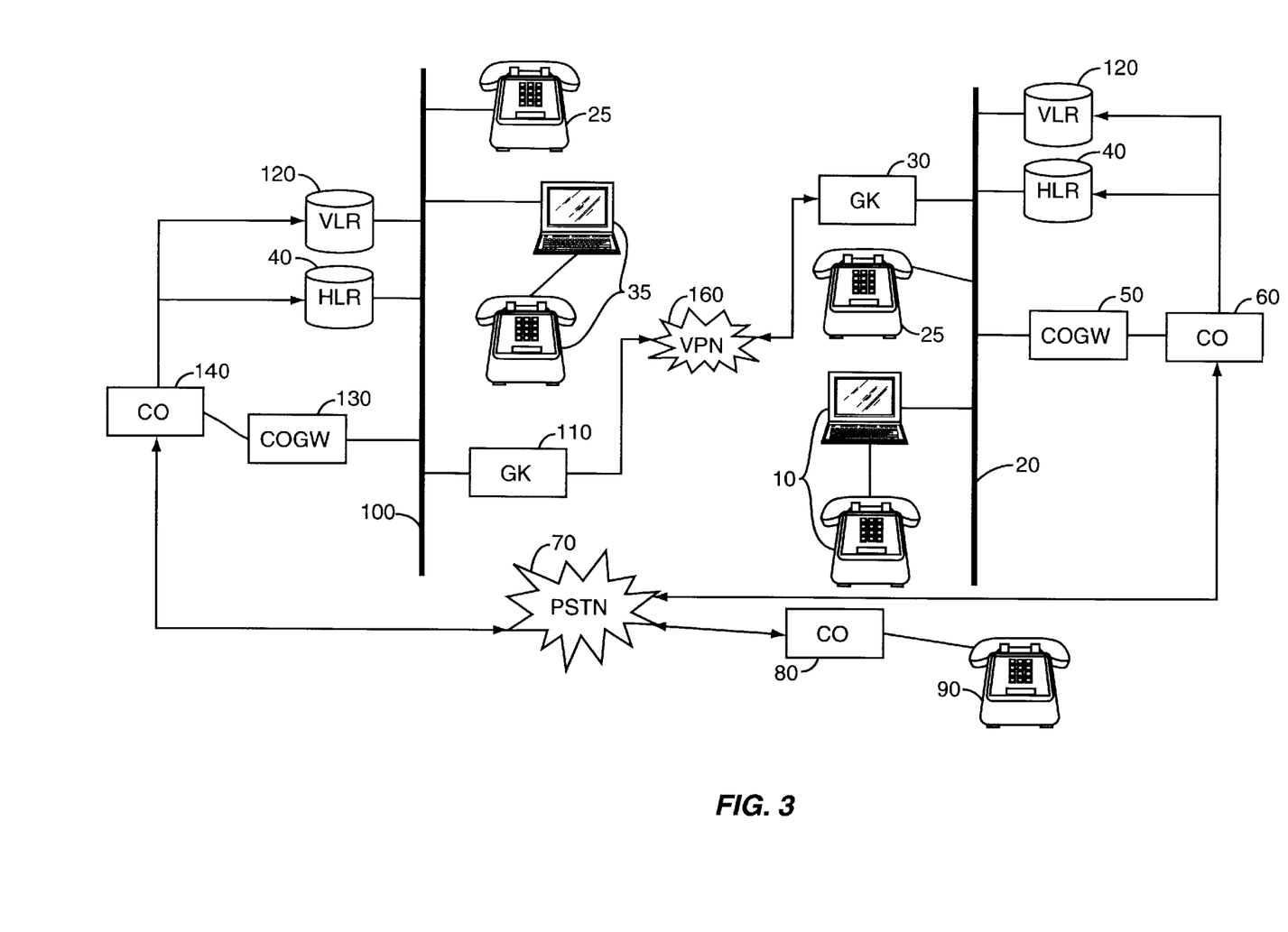
FIG. 3 is a block diagram illustrating the hardware nodes required for roaming on a private network.

Referring now to FIGS. 1–3, a packet data telephony network is shown in each figure. In FIGS. 2 and 3, two (2) packet data telephony networks are shown linked together by a public switching network and a virtual private network, respectively. It is to be understood that multiple (more than two) packet data telephony networks may be linked together. Each network has a number of common elements which include home location registers (HLR) 40, visitor location registers (VLR) 120, gatekeepers (GK) 30,110, gateways (COGW) 50,130, central offices (CO) 60,140, and various packet data telephony devices 10,25,35. Other devices may be connected to the packet data network without departing from the spirit or scope of the present invention.

FIG. 1 illustrates a home switch call scenario. Registration, call origination, and call termination functions are described for a subscriber utilizing his home network. Registration refers to the process of provisioning the home location register (or the visitor location register if roaming) with the subscriber's relevant data. Call origination refers to placing a call while call termination refers to receiving a call.

Registration is initiated when a subscriber logs into his computer at work. Once the subscriber connects his IP telephone 10 to his home IP network 20, registration is initiated with a local serving gatekeeper (GK) 30. Gatekeeper 30 forwards the registration information to a serving home location register (HLR) 40 which validates the subscriber. Home location register 40 responds with authentication data and subscriber profile data which is then stored within gatekeeper 30. Home location register 40 stores the directory number (DN) of the central office gateway (COGW) 50, the directory number of the subscriber, and the assigned IP address of the subscriber's IP telephone 10.

Consider a situation in which the subscriber wishes to initiate a call to someone who lives in a different service area. The subscriber's gatekeeper 30 queries his home location register 40 supplying his IP address. Home location register 40 supplies the subscriber's directory number, authentication data and any other data needed to place the call. The subscriber's gatekeeper 30 initiates a call origination via the central office gateway 50 and central office (CO) 60 by supplying the subscriber's directory number as the calling party and called party's directory number. The call routes normally over a public switching telephone network (PSTN) 70 to the called party's serving central office 80.

Now consider the reverse situation in which someone wishes to initiate a call to the subscriber (e.g., call termination). The caller 90 dials the subscriber's telephone directory number. The call routes normally over the public switching telephone network 70 from the caller's central office 80 to the subscriber's central office 60. The subscriber's central office 60 queries home location register 40 by supplying the subscriber's directory number and retrieves the directory number of the subscriber's central office gateway 50 and the IP address of the subscriber's IP phone 10. The subscriber's central office 60 routes the call to the subscriber's central office gateway 50 by supplying the IP address of the subscriber's IP phone 10. Lastly, the subscriber's central office gateway 50 uses the subscriber's IP address to route the call to the subscriber's IP telephone 10. Call origination may be optimized by duplicating the IP address to directory number mapping in the gatekeeper.

FIG. 2 illustrates the architecture necessary to place and receive calls while roaming on a public network. Consider a scenario where a subscriber is out of his home service area. The subscriber registers on a remote network by connecting to the remote network 100 and initiating contact with the remote network's gatekeeper 110 in which the subscriber supplies his home area directory number. The remote gatekeeper 110 receives the registration request and recognizes it as a non-local subscriber based on the supplied directory number. The remote gatekeeper 110 then forwards the request to a visitor location register (VLR) 120 which will validate the subscriber if his subscriber profile is already resident on remote visitor location register 120. If the subscriber's profile is not yet resident on remote visitor location register 120, then visitor location register 120 initiates a registration request to the subscriber's home location register 40 using the subscriber's supplied directory number and/or a system ID to locate home location register 40. The subscriber's home location register 40 responds by forwarding his subscriber profile and authentication data. Remote visitor location register 120 stores the subscriber's home directory number, his assigned remote network IP address, and the directory number of the remote network central office gateway 130. The subscriber's home location register 40, in turn, stores the remote network's 100 central office gateway 130 directory number and/or IP address. Next, remote visitor location register 120 responds to remote gatekeeper 110 with the subscriber's profile and authentication information which is stored in remote gatekeeper 110. Where possible, standard IS-41 or GSM-MAP protocols are used for communications among home location register nodes, visitor location register nodes, and gatekeeper nodes. The gatekeepers act as mobile switching centers (MSCs) with respect to IS-41 or GSM-MAP protocols.

Call origination for a public network roaming call scenario is performed as follows. When the subscriber wishes to call someone while roaming on a remote network, he dials the called party's directory number. The remote gatekeeper 110, recognizing that the subscriber's IP address is dynamically assigned, queries remote visitor location register 120 supplying the subscriber's assigned IP address. Remote visitor location register 120 sends back the subscriber's home directory number as well as authentication data needed to place the call. Remote gatekeeper 110 initiates an origination via remote central office gateway 130 and central office 140 by supplying the subscriber's home directory number as the calling party and the called party's directory number. The call routes normally over public switching telephone network 70 to the called party's central office 80. Call origination may be optimized by duplicating the IP address to directory number mapping in the gatekeeper.

Call termination for a public network roaming call scenario is performed as follows. This time, the subscriber receives a call from someone while he is roaming in another network. The caller dials the subscriber's telephone directory number. The call routes normally over public switching telephone network 70 from the caller's serving central office 80 to the subscriber's home central office 60. The subscriber's central office 60 queries its home location register 40 by supplying the subscriber's directory number. Home location register 40 returns the directory number of the central office gateway 130 of the network 100 in which the subscriber is roaming. The subscriber's home central office 60 routes the call to the remote network central office 140 using the remote central office gateway 130 directory number and supplying the subscribers home directory number and/or URL or electronic mail address. If the directory number only is supplied, remote central office 140 queries remote visitor location register 120 by supplying the subscriber's home directory number and retrieves the subscriber's remote assigned IP address. Remote central office 140 routes the call to remote central office gateway 130 by supplying the subscriber's dynamically assigned IP address. Lastly, remote central office gateway 130 uses the subscriber's IP address to route the call to the subscriber.

Private network roaming, illustrated in FIG. 3, is achieved in almost identical fashion as public network roaming with the following exceptions. IS41/GSM-MAP messages can be sent over a virtual private network (VPN) 160 instead of the IS-41 or GSM-MAP public network 150, thereby lowering costs. Second, the local gatekeeper can make least cost routing and/or quality of service decisions and choose to route a call over a public switching telephone network or a virtual private network.

FIGS. 4–9 illustrate method or process steps for various functions of the present invention. It is to be understood that each of the method or process steps illustrated herein are readily implementable by those of ordinary skill in the art as a computer program product having a medium with a computer program embodied thereon. The computer program product is capable of being loaded and executed on the appropriate computer processing device(s) in order to carry out the method or process steps described.

Figure 4:
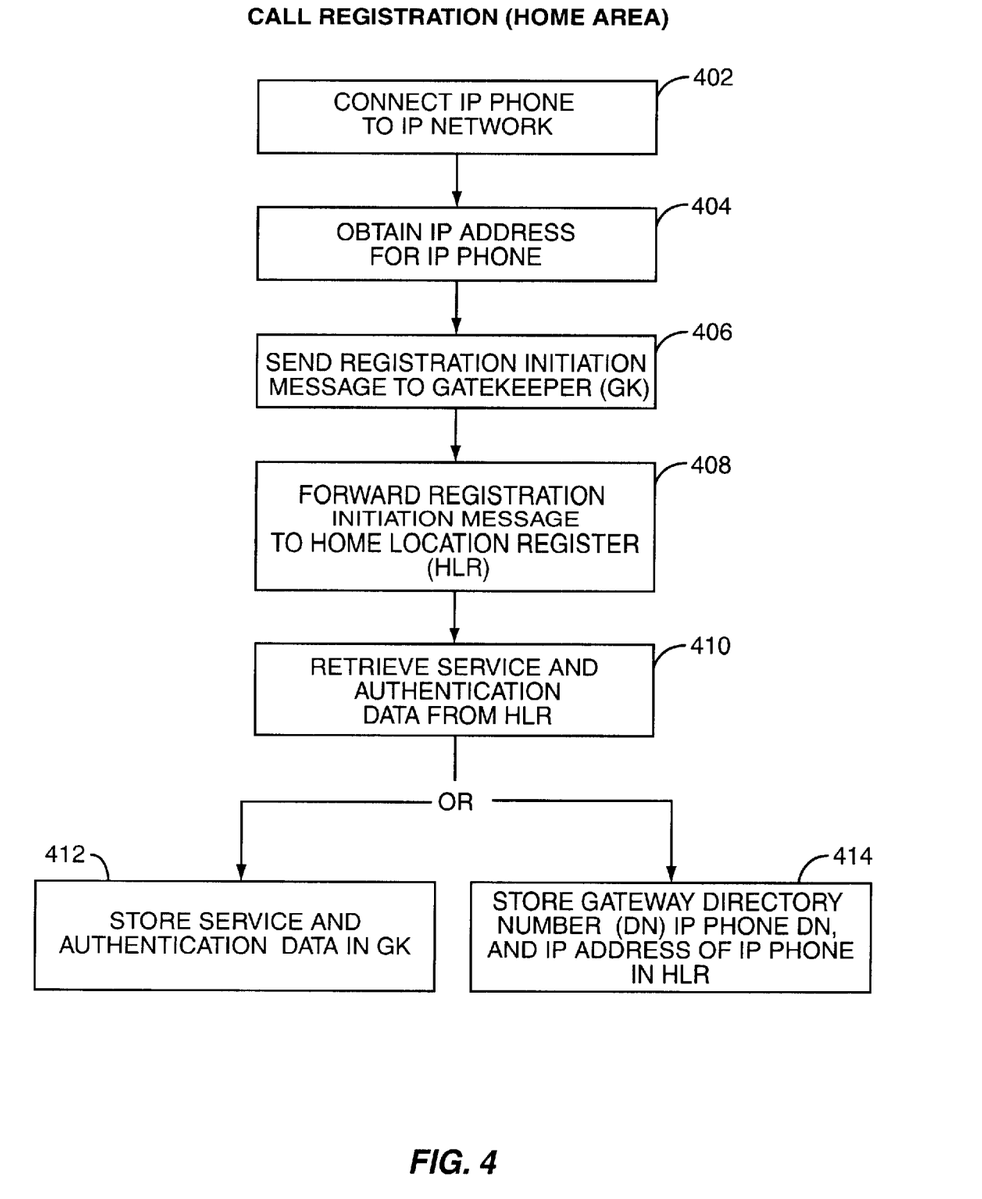
FIG. 4 illustrates the method or process steps for subscriber registration within the home area network.

FIG. 4 illustrates the method or process steps for subscriber registration within the home area network. Once a subscriber connects 402 his IP telephone to his home IP network, registration is initiated and an IP address is assigned 404 to the IP phone. A registration initiation message is sent 406 to the IP network gatekeeper. The gatekeeper forwards 408 the registration information to the serving home location register (HLR) which validates the subscriber's service and authentication data. The home location register responds 410 with authentication data and subscriber profile data. At this point, the authentication data and subscriber profile data can be stored within the gatekeeper 412 or the network gateway directory number, IP phone directory number, and assigned IP address can be stored in the home location register 414.

Figure 5:
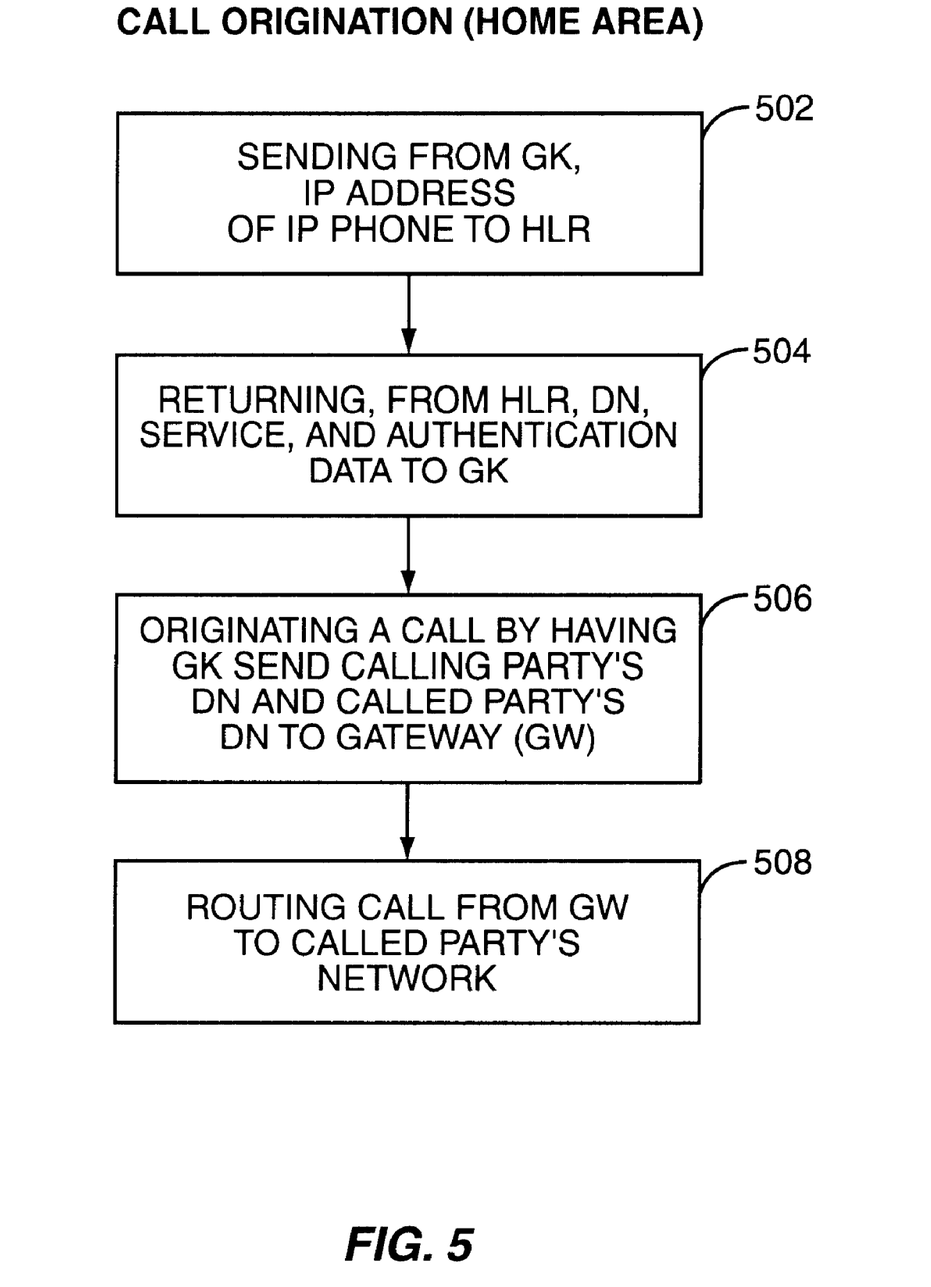
FIG. 5 illustrates the method or process steps for call origination for a subscriber within the home area network.

FIG. 5 illustrates the method or process steps for call origination for a subscriber within the home area network. Once a subscriber has registered his IP telephony device with his home area IP network, he may place or receive calls. To place a call (call origination), the subscriber dials and the gatekeeper sends 502 the IP address previously assigned during registration to the home location register. The home location register returns 504 the subscriber's directory number, authentication data and any other data needed to place the call to the gatekeeper. The subscriber's gatekeeper then originates 506 the call origination by supplying the subscriber's directory number as the calling party and called party's directory number to the central office gateway and central office (CO). The call routes 508 normally over a public switching telephone network (PSTN) to the called party's serving central office.

Figure 6:
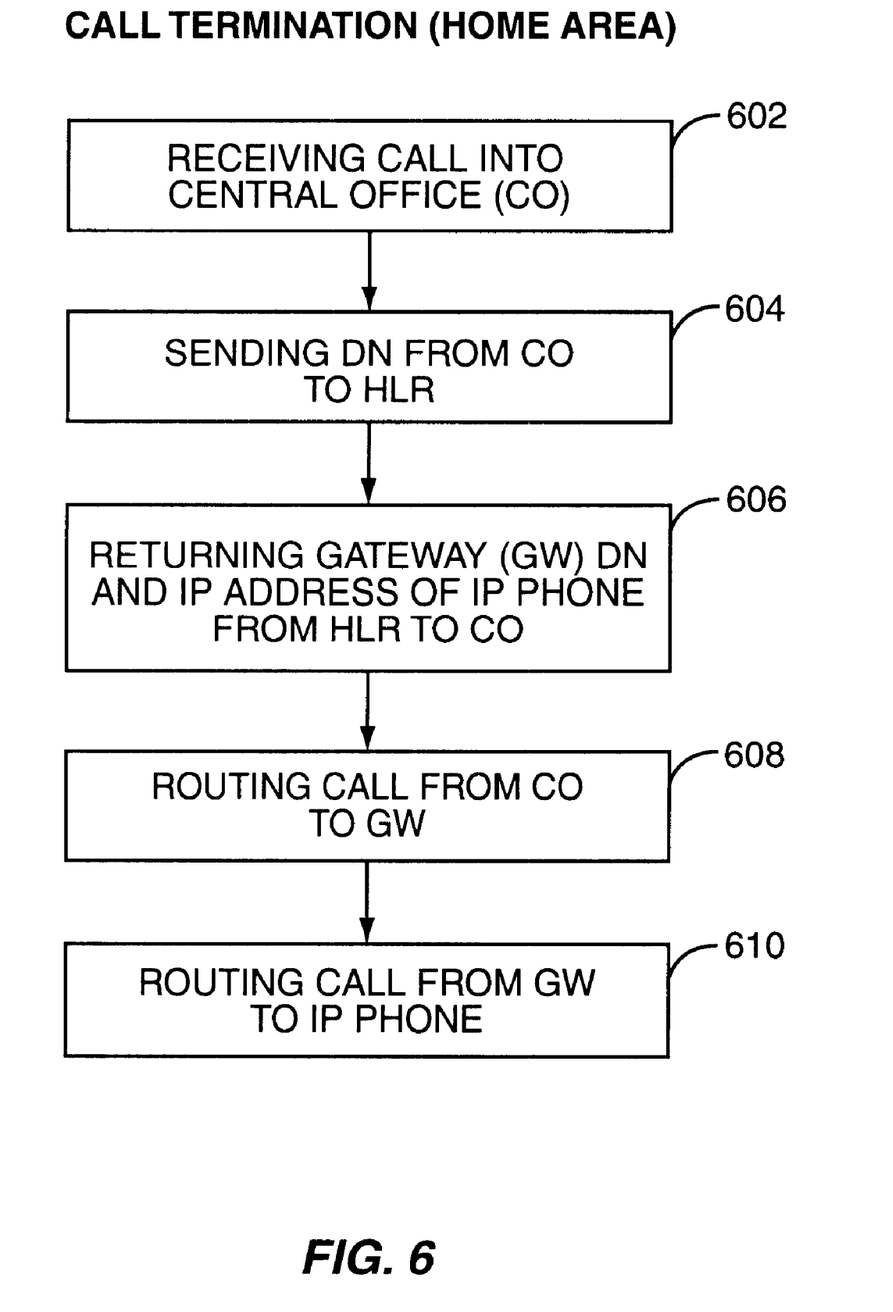
FIG. 6 illustrates the method or process steps for call termination within the home area network.

FIG. 6 illustrates the method or process steps for call termination within the home area network. A caller dials the subscriber's telephone directory number. The call routes normally over the public switching telephone network from the caller's central office to the subscriber's central office 602. To retrieve the call (call termination), the subscriber's central office queries 604 home location register by supplying the subscriber's directory number and retrieves 606 the directory number of the subscriber's central office gateway and the IP address of the subscriber's IP phone. The subscriber's central office routes 608 the call to the subscriber's central office gateway by supplying the IP address of the subscriber's IP phone Lastly, the subscriber's central office gateway uses the subscriber's IP address to route 610 the call to the subscriber's IP telephone.

Figure 7:
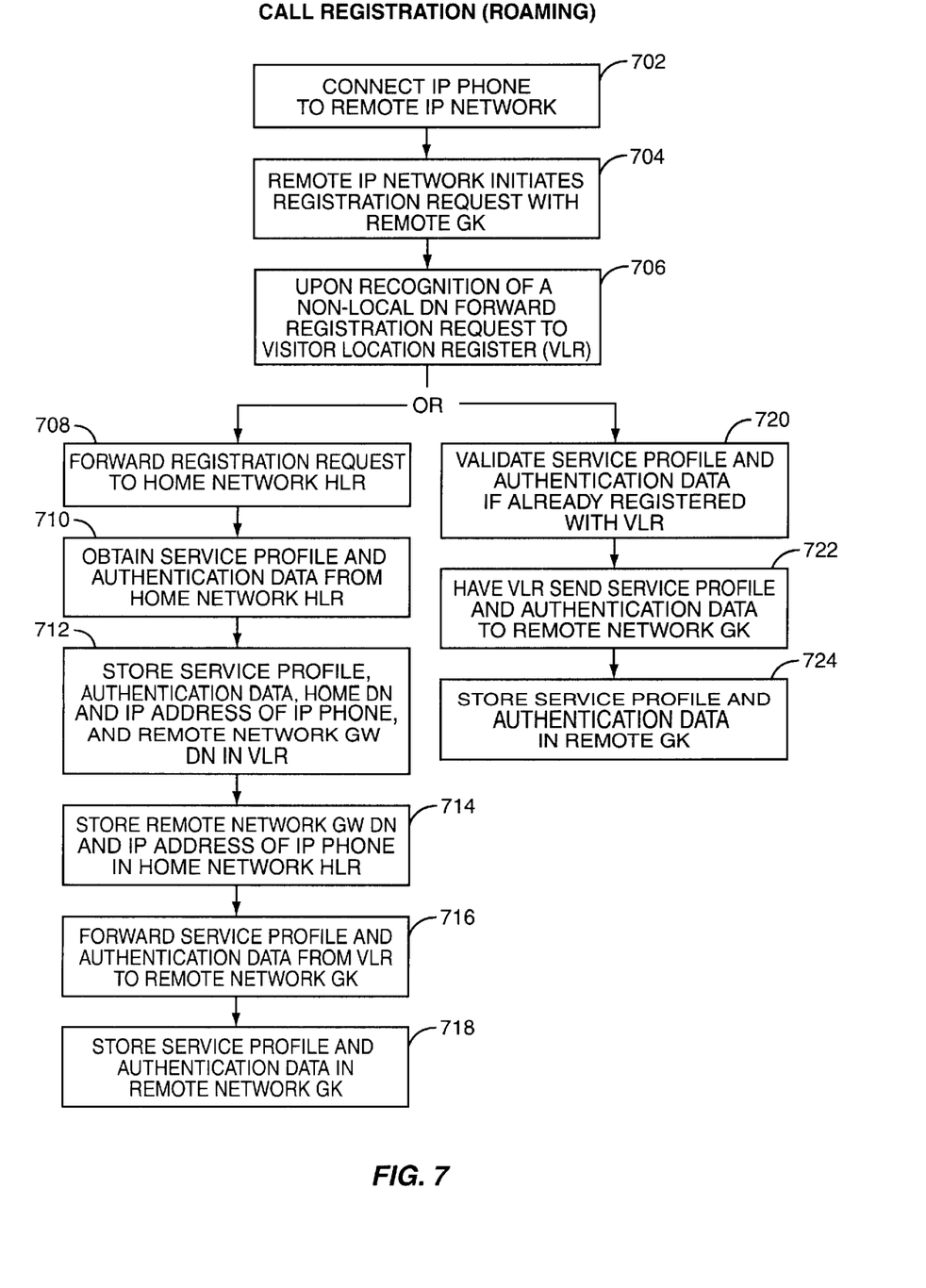
FIG. 7 illustrates the method or process steps for subscriber registration while roaming on a remote area network.

FIG. 7 illustrates the method or process steps for subscriber registration while roaming on a remote area network. The subscriber initiates registration on a remote IP network by connecting 702 his IP phone to the remote IP network. The remote IP network initiates 704 contact via a registration request message with its gatekeeper in which the subscriber supplies his home area directory number. The remote gatekeeper receives the registration request and recognizes it as a non-local subscriber based on the supplied directory number. The remote gatekeeper then forwards 706 the request to a visitor location register (VLR). If the subscriber's profile is not yet resident on remote visitor location register then visitor location register initiates 708 a registration request to the subscriber's home location register using the subscriber's supplied directory number and/or a system ID to locate home location register. The subscriber's home location register responds 710 by forwarding his subscriber profile and authentication data. Remote visitor location register stores 712 the subscriber's home directory number, his assigned remote network IP address, and the directory number of the remote network central office gateway. The subscriber's home location register in turn, stores 714 the remote network's central office gateway directory number and/or IP address. Next, remote visitor location register responds 716 to remote gatekeeper with the subscriber's profile and authentication information which is stored 718 in the remote gatekeeper.

Otherwise, the visitor location register will validate 720 the subscriber since his subscriber profile is already resident on remote visitor location register. The visitor location register sends 722 the service profile and authentication data to the remote IP network gatekeeper where it is then stored 724.

Figure 8:
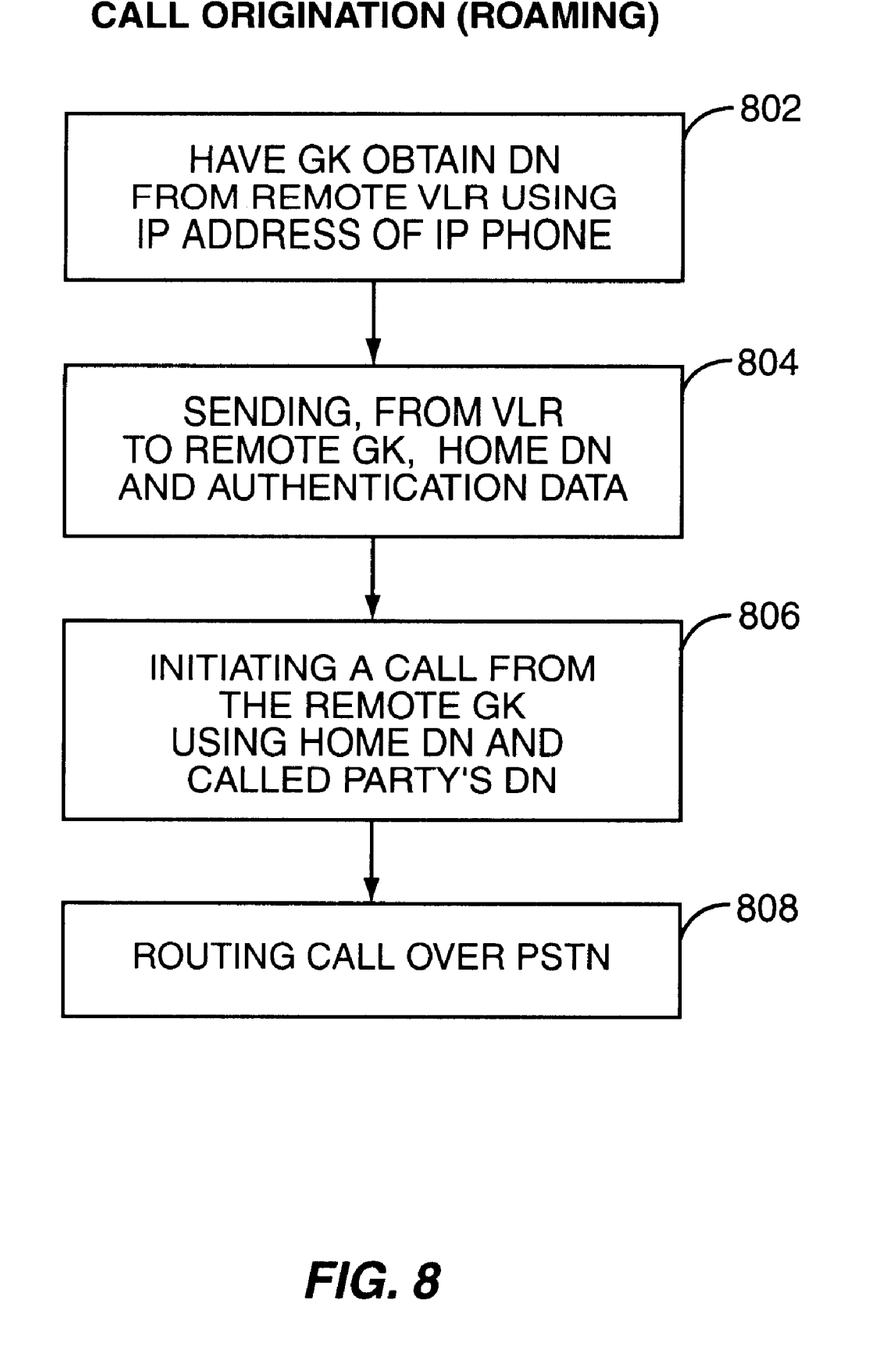
FIG. 8 illustrates the method or process steps for call origination while roaming on a remote area network.

FIG. 8 illustrates the method or process steps for call origination while roaming on a remote area network. When the subscriber wishes to call someone while roaming on a remote network, he dials the called party's directory number. The remote gatekeeper recognizing that the subscriber's IP address is dynamically assigned, queries 802 remote visitor location register supplying the subscriber's assigned IP address. Remote visitor location register sends 804 back the subscriber's home directory number as well as authentication data needed to place the call. Remote gatekeeper initiates 806 an origination via remote central office gateway and central office by supplying the subscriber's home directory number as the calling party and the called party's directory number. The call routes 808 normally over public switching telephone network to the called party's central office.

Figure 9:
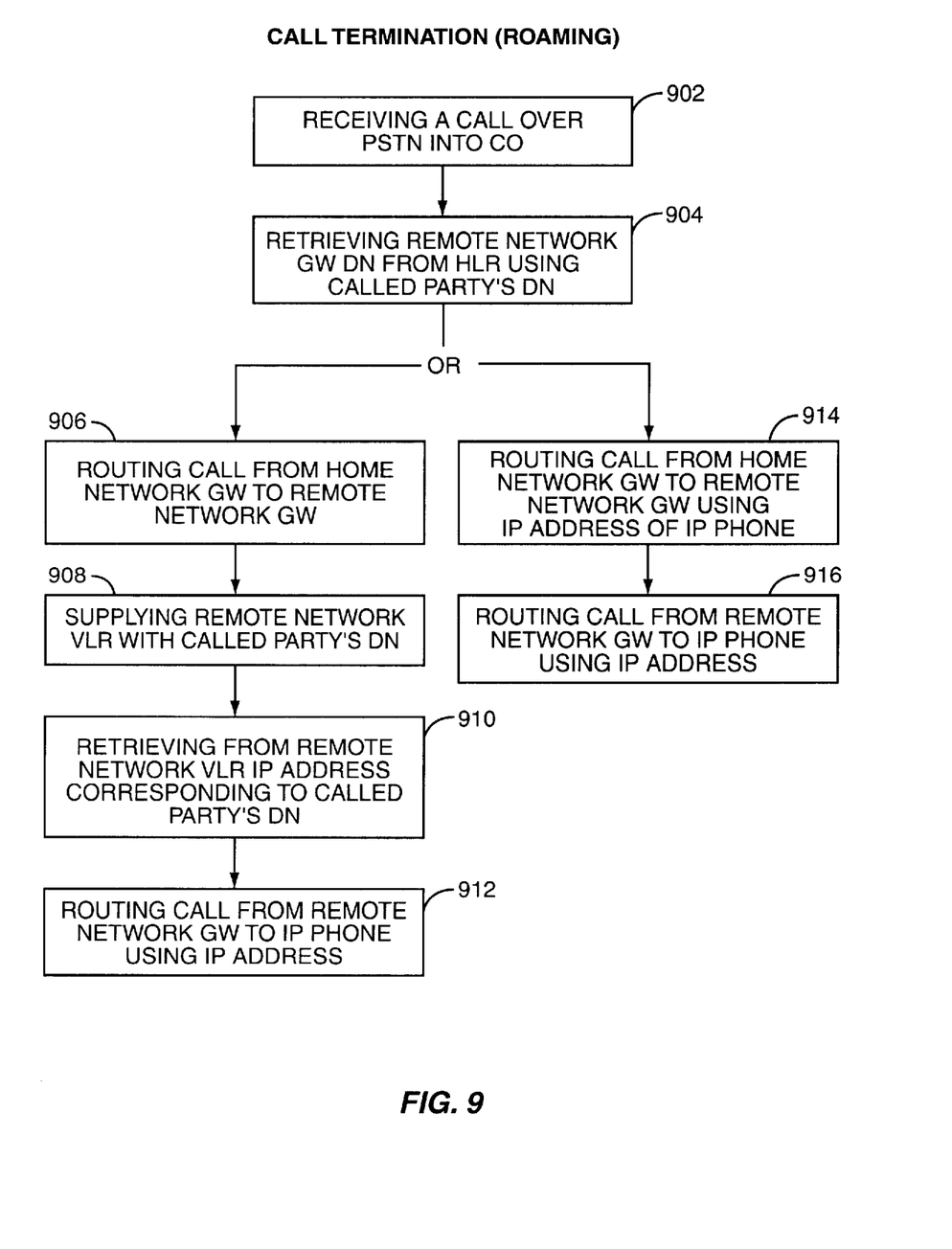
FIG. 9 illustrates the method or process steps for call termination while roaming on a remote area network.

FIG. 9 illustrates the method or process steps for call termination while roaming on a remote area network. A caller dials the subscriber's telephone directory number. The call routes normally over public switching telephone network from the caller's serving central office to the subscriber's home central office 902. The subscriber's central office queries its home location register by supplying the subscriber's directory number. Home location register returns 904 the directory number of the central office gateway of the network in which the subscriber is roaming. The subscriber's home central office gateway routes 906 the call to the remote network central office gateway using the remote central office gateway directory number and supplying the subscriber's home directory number and/or URL or electronic mail address. If the directory number only is supplied, remote central office queries 908 remote visitor location register by supplying the subscriber's home directory number and retrieves 910 the subscriber's remote assigned IP address. Remote central office routes 912 the call to the subscriber via remote central office gateway by supplying the subscriber's dynamically assigned IP address.

Alternatively, the call can be routed 914 from the home network gateway to the remote network gateway using the IP address of the subscriber's IP phone rather than using the subscriber's directory number. Remote central office would then routes 916 the call to the subscriber via remote central office gateway by supplying the subscriber's dynamically assigned IP address.

Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

It is to be understood that the foregoing is illustrative of the present invention and is not to be construed as limited to the specific embodiments disclosed, and that modifications to the disclosed embodiments, as well as other embodiments, are intended to be included within the scope of the appended claims.

For instance, an ATM or other packet data network may be substituted for the IP network used throughout the foregoing description.

Further, E.164 directory numbers to an IP address is only one mapping that the present invention contemplates. Universal resource locator (URL) addresses, electronic mail addresses, etc . . . may be substituted for the IP address mapping.

Still further, gateway protocols are freely substitutable. The present invention has been described using the H.323 protocol. Other protocols, including, but not limited to, internet protocol device control (IPDC), simple gateway control protocol (SGCP), and session initiation protocol (SIP) may also be implemented.

The invention is defined by the following claims, with equivalents of the claims to be included therein.

What is claimed is:

1. A method of managing call origination for subscribers on a packet data telephony network to a third party on a different network, said packet data telephony network including a home location register, gatekeeper, and gateway nodes, said method comprising the steps of:
   (a) registering a packet data communication device of a caller with the home location register of a packet data network, said packet data communication device having a directory number;
   (b) originating a call from the packet data communication device to a third party on a different network;
      wherein said registering step comprises:
         connecting said packet data communication device to said packet data network wherein a packet data network address is assigned to said packet data communication device;
         sending a registration initiation message to said gatekeeper;
         forwarding said registration initiation message to said home location register for service profile and authentication data validation purposes;
         returning, from said home location register, service profile and authentication data to said gatekeeper;
         storing said service profile and authentication data in said gatekeeper; and
         storing, in the home location register, the directory number of the gateway, the directory number of the packet data communication device, and the packet data address of the packet data communication device assigned during said connecting step;
      and wherein said originating step comprises
         initiating, via said gatekeeper, an origination in which the caller's directory number and a third parry's directory number are supplied to said gateway; and
         routing the call from said gateway to said third party on said different network.

2. The method of claim 1 wherein said originating step further comprises the steps of:
   (a) sending, from the gatekeeper, the packet data address of the packet data communication device in a query to the home location register; and
   (b) returning, from the home location register to the gatekeeper, the caller's directory number and authentication data.

3. The method of claim 1, further comprising:
   terminating a call from the packet data communication device with a third party on a different network.

4. The method of claim 3 wherein said terminating step comprises the steps of:
   (a) receiving a call into a central office;
   (b) sending the called party's directory number form the central office to the home location register;
   (c) returning the directory number of the gateway and the packet data address of the packet data communication device; and
   (d) routing the call to the gateway.

5. The method of claim 3 in which the third party's network is a public switching telephone network.

6. The method of claim 3 in which the packet data network is an Internet Protocol (IP) network.

7. The method of claim 3 in which the packet data communication device is an Internet Protocol (IP) telephone.

8. The method of claim 1 in which the third party's network is a public switching telephone network.

9. The method of claim 1 in which the packet data network is an Internet Protocol (IP) network.

10. The method of claim 1 in which the packet data communication device is an Internet Protocol (IP) telephone.

11. A method of public switching telephone network based roaming call origination for subscribers roaming in remote packet data networks that are communicable with the subscriber's home packet data network, wherein each packet data network includes a visitor location register, a home location register, a gatekeeper, and a gateway node, said method comprising the steps of:
  (a) registering a placket data communication device of a caller on a remote packet data network, said packet date communication device having a directory number;
  (b) originating a call from the packet data communication device on the remote network to a third party;
    and wherein said registering comprises
      connecting said packet data communication device to said remote packet data network wherein a packet data network address is assigned to said packet data communication device;
      having said remote network initiate a registration request with the remote gatekeeper by supplying the remote gatekeeper with the home directory number;
      forwarding said registration request from the remote gatekeeper, upon recognition of a non-local directory number, to the remote network visitor location register;
      forwarding the registration request to the home network home location register supplying the home directory number;
      returning, from the home network home location register to the remote network visitor location register, service profile and authentication data; and
      storing, in the rewrote network visitor location register, the service profile and authentication data, the home network directory number, the packet data address assigned in said connecting step, and the remote network gateway directory number.

12. The method of claim 11, wherein said registering step further comprises the steps of:
  storing in the home location register, the directory number of the remote network gateway and the packet data network address assigned in said connecting step;
  sending, from the remote network visitor location register to the remote network gatekeeper, the service profile and authentication data;
  storing, in the gatekeeper, the service profile and authentication data.

13. The method of claim 12 wherein said originating step comprises the steps of:
  (a) having the remote network gatekeeper request the directory number from the remote network visitor location register by supplying the packet data network address assigned during said connecting step;
  (b) returning, from the remote network visitor location register to the remote network gatekeeper, the home directory number and authentication data;
  (c) initiating, via the remote network gatekeeper, a call through the remote network gateway by supplying the home directory number and the third party's directory number; and
  (d) routing the call over a public switching telephone network to the third party.

14. The method of claim 11 in which the packet data network is an Internet Protocol (IP) network.

15. The method of claim 11 in which the packet data communication device is an Internet Protocol (IP) telephone.

16. The method of claim 11 wherein said registering step comprises the steps of:
  (a) connecting said packet data communication device to said remote packet data network wherein a packet data network address is assigned to said packet data communication device;
  (b) having said remote network initiate a registration request with the remote gatekeeper by supplying the remote gatekeeper with the home directory number;
  (c) forwarding said registration request from the remote gatekeeper, upon recognition of a non-local directory number, to the remote network visitor location register;
  (d) validating service profile and authentication data if the service profile and authentication data is currently registered on the remote network visitor location register;
  (e) sending, from the remote network visitor location register to the remote network gatekeeper, the service profile and authentication data; and
  (f) storing, in the remote network gatekeeper, the service profile and authentication data.

17. A method of public switching telephone network based roaming call termination for subscribers roaming in remote packet data networks that are communicable with the subscriber's home packet data network, wherein each packet data network includes a visitor location register, a home location register, a gatekeeper, and a gateway node, said method comprising the steps of:
  (a) registering a packet data communication device of a called pat on a remote packet data network, said packet data communication device having a directory number;
  (b) terminating a call from the packet data communication device on the remote network with a third party;
    and wherein said registering step comprises the steps of:
      connecting said packet data communication device to said remote packet data network wherein a packet data network address is assigned to said packet data communication device;
      having said remote network initiate a registration request with the remote gatekeeper by supplying the remote gatekeeper with the home directory number;
      forwarding said registration request from the remote gatekeeper, upon recognition of a non-local directory number, to the remote network visitor location register;
      forwarding the registration request to the home network home location register supplying the home directory number;
      returning, from the home network home location register to the remote network visitor location register, the service profile and authentication data; and
      storing, in the remote network visitor location register, the service profile and authentication data, the home network directory number, the packet data address assigned in said connecting step, and the remote network gateway directory number.

18. The method of claim 7 wherein said registering step further comprises the steps of:
  storing, in the home network home location register, the directory number of the remote network gateway and remote packet data network address assigned in said connection step;
  sending, from the remote network visitor location register to the remote network gatekeeper, the service profile and authentication data; and storing, in the remote network gatekeeper, the service profile arid authentication data.

19. The method of claim 18 wherein said terminating step comprises the steps of:
   (a) receiving a call over a public switching telephone network into the home network central office;
   (b) querying the home network home location register by supplying the called party's directory number and retrieving the remote network's gateway directory number;
   (c) routing the call from the home network gateway to the remote network gateway supplying the home directory number;
   (d) supplying the remote network visitor location register with the called party's home directory number;
   (e) retrieving from the remote network visitor location register the packet data network address assigned during said connecting step corresponding to the called party's home directory number; and
   (f) routing the call from the remote network gateway using the packet data network address assigned during said connecting step.

20. The method of claim 18 wherein said terminating step comprises the steps of:
   (a) receiving a call over a public switching telephone network into the home network central office;
   (b) querying the home network home location register by supplying the called party's directory number and retrieving the remote network's gateway directory number;
   (c) routing the call from the home network gateway to the remote network gateway supplying the called partly's remote packet data network address; and
   (d) routing the call from the remote network gateway to the called party using the packet data network address assigned during said connecting step.

21. The method of claim 17 in which the packet data network is an Internet Protocol (IP) network.

22. The method of claim 17 in which the packet data communication device is an Internet Protocol (IP) telephone.

23. The method of claim 17 wherein said registering step comprises the steps of:
   (a) connecting said packet data communication device to said remote packet data network wherein a packet data network address is assigned to said packet data communication device;
   (b) having said remote network initiate a registration request with the remote gatekeeper by supplying the remote gatekeeper with the home directory number;
   (c) forwarding said registration request from the remote gatekeeper, upon recognition of a non-local directory number, to the remote network visitor location register;
   (d) validating service profile end authentication data if the service profile and authentication data are currently registered on the remote network visitor location register;
   (e) sending, from the remote network visitor location register to the remote network gatekeeper, the service profile and authentication data; and
   (f) storing, in the remote network gatekeeper, the service profile and authentication data.

24. A computer program product for managing calls between subscribers on a packet data telephony network and subscribers not on a packet data telephony network from the packet data telephony network subscriber's home area, wherein said packet data network includes a home location register, a gatekeeper, and a gateway node, the computer program product having a medium with a computer program embodied thereon, the computer program product comprising:
   computer program code for registering a packet data communication device of a caller with the home location register of a packet data network, said packet data communication device having a directory number;
   computer program code for originating a call from the packet data communication device to a third party on a different network;
   computer program code for terminating a call to the packet data communication device from a third party on a different network;
   wherein said computer program code for registering comprises:
      computer program code for connecting said packet data communication device to said packet data network wherein a packet data network address is assigned to said packet data communication device;
      computer program code for sending a registration initiation message to said gatekeeper;
      computer program code for forwarding said registration initiation message to said home location register for service profile and authentication data validation purposes;
      computer program code for returning, from said home location register, service profile and authentication, data to said gatekeeper;
      computer program code for storing said service profile and authentication data in said gatekeeper;
      computer program code for storing, in the home location register, the directory number of the gateway, the directory number of the packet data communication device, and the packet data address of the packet data communication device assigned by said computer program code for connecting;
   and wherein said computer program code for originating comprises:
      computer program code for initiating, via said gatekeeper, an origination in which the caller's directory number and a third party's directory number are supplied to said gateway, and
      computer program code for routing the call from said gateway to said third party on said different network.

25. The computer program product of claim 24 wherein said originating computer program code further comprises:
   computer program code for sending, from the gatekeeper, the packet data address of the packet data communication device in a query to the home location register; and
   computer program code for returning, from the home location register to the gatekeeper, the caller's directory number and authentication data.

26. The computer program product of clam 24 wherein said terminating computer program code comprises:
   computer program code for sending the directory number from the central office to the home location register upon receipt of a call into the central office;
   computer program code for returning the directory number of the gateway and the packet data address of the packet data communication devices;
   computer program code for routing the call to the gateway, and computer program code for routing the call from the gateway to the packet data communication device.

27. A computer program product for managing calls between subscribers on a packet data telephony network and subscribers not on a packet data telephony network while the packet data telephony network subscriber is roaming outside the subscriber's home area on a remote packet data telephony network wherein each packet data network includes a visitor location register, a home location register, a gatekeeper, and a gateway node, the computer program product having a medium with a computer program embodied thereon, the computer program product comprising:

computer program code for registering a packet data communication device for a caller on a remote packet data network, said packet data communication device having a directory number;

computer program code for originating a call from the packet data communication device on the remote network to a third party;

computer program code for terminating a call to the packet data communication device on the remote network from a third party;

wherein said registering code comprises:

computer program code for connecting said packet data communication device to said remote packet data network wherein a packet data network address is assigned to said packet data communication device;

computer program code for having said remote network initiate a registration request with the remote gatekeeper by supplying the remote gatekeeper with the home directory number;

computer program code for forwarding said registration request from the remote gatekeeper, upon recognition of a non-local directory number, to the remote network visitor location register;

computer program code for forwarding the registration request to the home network home location register supplying the home directory number;

computer program code for returning from the home network home location register to the remote network visitor location register, service profile and authentication data; and computer program code for storing, in the remote network visitor location register, the service profits and authentication data, the home network directory number, the packet data address assigned in said connecting step, and the remote network gateway directory number.

28. The computer program product of claim 27 wherein said registering computer program code further comprises:

computer program code for storing, in the home network home location register, the directory number of the remote network gateway and the packet data network address assigned in said connecting;

computer program code for sending, from the remote network visitor location register to the remote network gatekeeper, the service profile and authentication data; and computer program code for storing, in the gatekeeper, the service profile and authentication data.

29. The computer program product of claim 28 wherein said originating computer program code comprises:

computer program code for having the remote network gatekeeper request the directory number from the remote network visitor location register by supplying the packet data network address assigned during said connecting, computer program code for returning, from the remote network visitor location register to the remote network gatekeeper, the home directory number and authentication data;

computer program code for initiating, via the remote network gatekeeper, a call through the remote network gateway by supplying the borne directory number and the third party's directory number; and computer program code for routing the call over a public switching telephone network to the third party.

30. The computer program product of claim 28 wherein said terminating computer program code comprises:

computer program code for receiving a call over a public switching telephone network into the home network central office;

computer program code for querying the home network home location register by supplying the called party's directory number ands retrieving the remote network's gateway directory number;

computer program code for routing the call from the home network gateway to the remote network gateway supplying the home directory number;

computer program code for supplying the remote network visitor location register with the called party's home directory number;

computer program code for retrieving from the remote network visitor location register the packet data network address assigned during said connecting step corresponding to the called party's home directory number; and computer program code for routing the call from the remote network gateway using the packet data network address assigned during said connection step.

31. The computer program product of claim 27 wherein said registering computer program code comprises:

computer program code for connecting said packet data communication device to said remote packet data network wherein a packet data network address is assigned to said packet data communication device;

computer program code for having said remote network initiate a registration request with the remote gatekeeper by supplying the remote gatekeeper with the home directory number;

computer program code for forwarding said registration request from the remote gatekeeper, upon recognition of a non-local directory number, to the remote network visitor location register;

computer program code for validating service profile and authentication data if the service profile and authentication data are currently registered on the remote network visitor location register;

computer program code for sending, from the remote network visitor location register to the remote network gatekeeper, the service profile and authentication data; and computer program code for storing, in the remote network gatekeeper, the service profile and authentication data.

32. An apparatus for managing calls between subscribers on a packet data telephony network and subscribers not on a packet data telephony network from the packet data telephony network subscriber's home area, wherein said packet data network includes a home location register, a gatekeeper, and a gateway node, said apparatus comprising:

means for registering a packet data communication device with the home location register of a packet data network;

means for originating a call from the packet data communication device to a third party on a different network means;

for terminating a call to the packet data communication device from a third party on a different network;

wherein said registering means comprises:

means for connecting said packet data communication device to said packet data network wherein a packet data network address is assigned to said packet data communication device;

means for sending a registration initiation message to said gatekeeper;

means for forwarding said registration initiation message to said home location register for service profile and authentication data validation purposes;

means for returning, from said home location register, service profile and authentication data to said gatekeeper;

means for storing said service profile and authentication data in said gatekeeper; and means for storing, in the home location register, the directory number of the gateway, the directory number of the packet data communication device, and the packet data address of the packet data communication device assigned during said connecting step.

33. The apparatus of claim 32 wherein said originating means comprises:

means for sending from the gatekeeper, the packet data address of the packet data communication device in a query to the home location register; and means for returning, from the home location register to the gatekeeper, the caller's directory number and authentication data.

34. The apparatus of claim 32 wherein said terminating means comprises:

means sending the directory number form the central office to the home location register upon receipt of a call into the central office;

means for returning the directory number of the gateway and the packet data address of the packet data communication device;

means for routing the call to the gateway; and means for routing the call from the gateways to the packet data communication device.

35. An apparatus for managing calls between subscribers on a packet data telephony network and subscribers not on a packet data telephony network while the packet data telephony network subscriber is roaming outside the subscriber's home area on a remote packet data telephony network, wherein each packet data network includes a visitor location register, a home location register, a gatekeeper, and a gateway node, said apparatus comprising:

means for registering a packet data communication device of a caller on a remote packet data network, said packet data communication device having a directory number;

means for ongoing a call from the packet data communication device on the remote network to a third party;

means for terminating a call to the packet data communication device on the remote network from a third party; and wherein said registering means comprises:

means for connecting said packet data communication device to said remote packet data network wherein a packet data network address is assigned to said packet data communication device;

means for having said remote network initiate a registration request with the remote gatekeeper by supplying the remote gatekeeper with the home directory number;

means for forwarding said registration request from the remote gatekeeper, upon recognition of a non-local directory number, to the remote network visitor location register;

means for forwarding the registration request to the home network home location register supplying the home directory number;

means for returning, from the home network home location register to the remote network visitor location register, service profile and authentication data; and means for storing, in the remote network visitor location register, the service profile and authentication data, the home directory number, the packet data address assigned by said connecting means, and the remote network gateway directory number.

36. The apparatus of claim 35 wherein said registering means further comprises:

means for storing, in the home network home location register, the directory number of the remote network gateway and the packet data network address assigned by said connecting means;

means for sending from the remote network visitor location register to the remote network gatekeeper, the service profile and authentication data; and means for storing, in the gatekeeper, the service profile and authentication data.

37. The apparatus of claim 36 wherein said originating means comprises:

means for having the remote network gatekeeper request the directory number from the remote network visitor location register by supplying the packet data network address assigned by said connecting means;

means for returning, from the remote network visitor location register to the remote network gatekeeper, the home directory number and authentication data;

means for initiating, via the remote network gatekeeper, a call through the remote network gateway by supplying the home directory number and the third party's directory number; and means for routing the call over a public switching telephone network to the third party.

38. The apparatus of claim 36 wherein said terminating means comprises:

means for receiving a call over a public switching telephone network into the home network central office;

means for querying the home network home location register by supplying the called party's directory number and retrieving the remote network's gateway directory number;

means for routing the call from the home network gateway to the remote network gateway supplying the home directory number;

means for supplying the remote network visitor location register with the called party's home directory number;

means for retrieving from the remote network visitor location register the packet data network address assigned by said connecting means corresponding to the called parry's home directory number; and means for routing the call from the remote network gateway using the packet data network address assigned by said connecting means.

39. The apparatus of claim 35 wherein said registering means comprises:

means for connecting said packet data communication device to said remote packet data network wherein a packet data network address is assigned to said packet data communication device;

means for having said remote network initiate a registration request with the remote gatekeeper by supplying the remote gatekeeper with the home directory number;

means for forwarding said registration request from the remote gatekeeper, upon recognition of a non-local directory number, to the remote network visitor location register;

means for validating service profile and authentication data if the service profile and authentication data are currently registered on the remote network visitor location register;

means for sending, from the remote network visitor location register to the remote network gatekeeper, the service profile and authentication data; and means for storing, in the remote network gatekeeper, the service profile and authentication data.

* * * * *